United States Patent [19]

Miller, Jr. et al.

[11] Patent Number: 4,522,397
[45] Date of Patent: * Jun. 11, 1985

[54] FILLED SHELL BOWLING BALL

[75] Inventors: Charles M. Miller, Jr.; Samuel J. Orlando, both of San Antonio, Tex.

[73] Assignee: Columbia Industries, Inc., San Antonio, Tex.

[*] Notice: The portion of the term of this patent subsequent to May 11, 1999 has been disclaimed.

[21] Appl. No.: 344,187

[22] Filed: Jan. 29, 1982

Related U.S. Application Data

[63] Continuation-in-part of Ser. No. 106,749, Dec. 26, 1979, Pat. No. 4,328,967.

[51] Int. Cl.³ .............................................. A63B 37/14
[52] U.S. Cl. ................ 273/63 D; 273/63 G; 264/241
[58] Field of Search ............... 273/63 R, 63 A–63 G, 273/58 J, 128 A

[56] References Cited

U.S. PATENT DOCUMENTS

| | | | |
|---|---|---|---|
| 3,068,007 | 12/1962 | Satchell | 273/63 G |
| 3,090,620 | 5/1963 | Consallay | 273/63 R |
| 3,206,201 | 9/1965 | Hendricks | 273/63 R |
| 3,248,113 | 4/1966 | Baggentoss | 273/63 R |
| 3,256,018 | 6/1966 | Baggentoss | 273/63 R |
| 4,133,527 | 1/1979 | Price | 273/63 D |
| 4,328,967 | 5/1982 | Orlando et al. | 273/63 G |

Primary Examiner—George J. Marlo
Attorney, Agent, or Firm—Gunn, Lee & Jackson

[57] ABSTRACT

A bowling ball having hard and inflexible flake materials arranged in a substantially interlocking relationship and located at or just below the outer surface of the bowling ball to form a substantially continuous interlocking armored layer about the bowling ball which causes it to have an appreciably greater resistance to penetration by a Shore D Hardness test needle than a bowling ball of identical composition but without the flake type materials. Sufficient resistance to penetration by the Shore D Hardness test needle gives a durometer hardness of at least seventy-two. The flake materials have an average size of from −100 mesh to 40/100 mesh and comprise between one to ten percent by volume of the bowling ball's outer shell admixture. Further, the outer surface of the bowling ball may be pitted by including dissolvable particles and collapsible hollow particles in the outer shell and given microscopic protrusions due the addition of soft resilient particles and hard inflexible particles in the outer shell of the bowling ball all of which are sufficiently small to allow the ball to roll upon the bowling lane without appreciable discontinuities in forward motion and without appreciable damage to said bowling lane. Further, the angular momentum and hooking action of the bowling ball is affected by adding particles with a density at least twenty percent greater than the density of the substrate in the outer shell or by placing particles capable of reducing the weight by volume of the outer shell by at least five percent.

13 Claims, 6 Drawing Figures

FILLED SHELL BOWLING BALL

This is a continuation-in-part application of U.S. patent application Ser. No. 106,749, now U.S. Pat. No. 4,328,967 filed on Dec. 26, 1979 for Lightweight Bowling Ball which patent is incorporated herein for all purposes.

BACKGROUND OF THE INVENTION

This invention relates to the manufacture of bowling balls and, more specifically, to high performance bowling balls. Because a bowling ball must necessarily be of a certain diameter, hardness, and resiliency to satisfy the requirements of the American Bowling Congress and must also have the capacity of withstanding repeated inertial shocks without cracking, fracturing, or denting, bowling balls are typically manufactured to be solid throughout. Compliance with the American Bowling Congress Bowling Ball Specifications (hereinafter referred to as "A.B.C. Specifications") is of vital commercial importance because only complying balls may be used in the majority of bowling tournaments held in the United States. A copy of the Aug. 1, 1976 A.B.C. Specifications, which specifications are still current, is attached hereto as Exhibit "A".

One or more inner cores or shells may be used within the bowling ball. The inner core is typically comprised of materials of various densities, such as sawdust, barium sulfate and different concrete-like materials. The densities of these materials generally range from about 0.12 g/ml to 5.0 g/ml. The overall density of the inner core is adjusted by varying the ratio of high and low density materials.

The typical bowling ball containing conventional materials and manufactured using conventional methods has an outermost layer comprised of an essentially homogeneous material, such as rubber or polyester resin having a density ranging from 1.1 to 1.3 g/ml.

BRIEF DESCRIPTION OF THE PRIOR ART

A. C. Baggentoss, et al (U.S. Pat. No. 3,248,113), J. P. Hendricks (U.S. Pat. No. 3,206,201), F. F. Satchell (U.S. Pat. No. 3,068,007), A. C. Baggentoss (U.S. Pat. No. 3,256,018) and J. W. Consolloy (U.S. Pat. No. 3,090,620) all show methods of making bowling balls. It is known, as is shown by the above patents, that an outer resinous shell may be placed about an inner core to form a serviceable bowling ball.

F. L. Price (U.S. Pat. No. 4,133,527) discloses a method of creating cavities in the outer surface of bowling balls by adding soft rubber buffing dust to a hard rubber outer shell. The soft rubber particles become dislodged during grinding and fine polishing to leave cavities upon the outer surface. Price does not teach or suggest the use of particles which, rather than being dislodged during the manufacturing process, instead remain to be functional during use. Some of the disclosed products herein, for example, contain particles which protrude from the finished ball. Further, other of the disclosed products herein are novel and nonobvious ways of creating a more frictionous outer surface such as through the use of hollow fly ash microspheres, some of which protrude from the outer surface of the ball and others of which collapse to produce a microfine grained surface. Essentially Price is limited in concept and teaching to a method of creating cavities upon the surface of a conventional rubber bowling ball. Such conventional rubber bowling balls are typically made of an ebonite rubber material by casting or by extruding a blend extremely viscous material into large rubber sheets from which circles are cut. Circles are placed into mold halves, a core sandwiched between them and the solid sheets vulcanized to form a continuous shell. Price's process therefore is not analogous to the casting of thermosetting liquid resins of low viscosity into plastic balls. The invented process disclosed herein deals with problems of particle flotation and settling, deaeration, maintenance of uniform distribution and other problems not present in the rubber casting of Price. In particular Price merely uses materials of a single general chemical family of ebonite rubber, the only difference being hardness. The admixture comprises a soft rubber powder within a hard cover substrate. Price thus does not anticipate nor deal with the problems of particle/substrate incompatibility and particle/substrate density differences present in the disclosed process of using elastomeric particles and other high performance particles in low viscosity thermosetting resin plastic balls. The instant disclosure both shows balls and methods which are different in kind over Price's methods.

Bowling balls typically have a circumference of about 27 inches, a diameter of about 8.6 inches, and are constructed either of one solid sphere or of an inner core and at least one outer shell. Due to the many parameters which a bowling ball must satisfy (described above), the materials used to manufacture bowling balls are typically hard and dense. Although many bowling balls are comprised either solely of ebonite (vulcanized rubber with enough sulfur to make it quite hard) or have outermost shells of vulcanized rubber, the types of materials used in these balls give them a hard and smooth outer surface. It is well known that conventional balls are manufactured to be slick by grinding and polishing operations.

Attempts at creating bowling balls which have an outer surface which is not slick have encountered many difficulties. An initial difficulty is that continuous treads, such as are used upon automobile tires, are inappropriate upon bowling balls since their spherical shape makes the exact direction of angular rotation somewhat unpredictable. Further, the A.B.C. Specifications state that "The surface of the ball shall be free of all depressions or grooves of specific pattern . . . ." All attempts to use a soft rubber material similar to that used in automobile tires rather than the hard dense rubber used in conventional balls have been unsuccessful in the past due to the A.B.C. Specifications, which require that the outer surface of the bowling ball be sufficiently hard to register 72 durometer D upon a device known in the bowling industry as a Shore D Hardness Tester. ("The surface hardness of bowling balls shall not be less than 72 durometer D" A.B.C. Specifications.) To achieve the hardness required to satisfy this standard, balls made primarily of rubber have been insufficiently elastic to have a high coefficient of friction because the hardening of the rubber effectively deprived them of their high friction characteristics. Thus, solid balls or balls with outer shells of soft rubber or other resilient materials have not been successfully used in the past to achieve greater traction upon the bowling alley because the very softness needed to improve the balls' traction have caused them to fail the American Bowling Congress hardness test.

An additional problem is that, due to the repeated severe inertial shocks to the bowling ball during its lifetime, the bowling ball must be constructed to resist cracking and fracturing. If grooving of any type is used upon the outer surface of the ball, the grooves will present ideal locations for the formation of such cracks and fractures. Patterns of grooves are, therefore, further unworkable as a solution.

Improving traction by applying an outer adhesive layer to the bowling ball which is extremely thin, is also impractical. Extremely thin coatings of adhesive are difficult to apply uniformly and once applied quickly wear off. In any event, such coatings are outlawed by the A.B.C. Specifications ("No foreign material may be placed on the outer surface of the ball") and, therefore, are not commercially feasible. Coatings of dry, hard abrasives such as sandpaper are also impractical due to the inability of such abrasives to withstand repeated inertial shock without cracking and chipping, which would immediately end the usefulness of the ball. Further, such materials would also not comply with the A.B.C. Specifications.

SUMMARY OF THE INVENTION

The present invention overcomes many of the problems of the prior art and provides novel high performance bowling balls and a method of making the same. The invented high performance balls have the necessary 72 durometer D hardness as judged by the American Bowling Congress, long term resistance to inertial shock damage, and high performance characteristics.

Briefly stated, the present invention comprises a bowling ball composed of a heterogeneous admixture of thermosetting resin and various particles added specifically for the purpose of giving the ball high performance characteristics. The particles are substantially uniformly distributed throughout the shell layer of the ball and are exposed by the machining process which cuts through some of them and effectively places them on the surface, are sufficiently numerous and sufficiently effective to cause the ball to have appreciably greater traction upon typical bowling alleys than similar bowling balls without the particles and yet not be distributed in such a way or be of such a type that they cause appreciable discontinuities in the motion of the bowling ball as it rolls down the bowling alley. The term "particles" as used herein shall also include the terms "flakes" and "fibers" within its usual definition.

Five types of particles are described and used herein to satisfy these requirements:

(a) Hard abrasive materials, such as hollow fly ash microspheres and high density glass bubbles which are uniformly distributed upon the surface of the ball and which dig into the surface of the bowling alley and give the bowling ball a microfine grained surface to prevent hydroplaning as occurs in conventional balls;

(b) Soft materials, such as talc or calcium carbonate, which are uniformly distributed upon the surface of the ball and which flake out of the resin matrix to produce a fine grained outer surface which prevents hydroplaning as occurs in conventional balls;

(c) Resilient materials, such as soft granulated rubber particles, which are uniformly distributed upon the surface of the ball and which protrude from the surface subsequent to grinding the ball (the grinding removing more of the inflexible resin matrix than of the granulated rubber due to the rubber partially defeating the grinding process by compressing) which produce a bowling ball with a high coefficient of friction and a fine grained outer surface to prevent hydroplaning as occurs in conventional balls;

(d) Low density bubbles which are uniformly distributed upon and close to the surface of the ball which bubbles collapse during the manufacture and use of the bowling ball to produce a fine grained outer surface to prevent hydroplaning as occurs in conventional balls; and (e) Flake and/or fiberous reinforcing materials, such as high aspect ratio mica flakes, flakes of slate, glass flakes, and milled glass fibers, which are uniformly distributed upon and close to the surface of the ball and which inhibit the penetration of sharp pointed objects into the ball. When grouped in a uniform and interlocking manner, the flakes and/or fiberous materials form an effectively continuous armored layer to prevent penetration of the ball. This enables the use of a fairly soft resin matrix on a macroscale, but on the microscale, the armored effect deflects the indenter tip effectively defeating the function of the meter.

As is noted above, applying a very thin layer of such materials to the outer surface of the bowling ball has proved to be impractical. It is instead necessary to either cast the ball entirely of the resin/particle admixture or cast such an admixture shell of substantial thickness about an inner core. This creates the additional problem of achieving and maintaining uniform distribution of the particles upon the entire outer surface of the bowling ball.

In any curing process of such an admixture, the particles will either tend to float or to sink within the admixture due to differences in particle density and resin density to produce a non-uniform distribution of the particles and an unusable bowling ball. A method of preparing a uniformly dispersed admixture, casting it in the form of a bowling ball and curing it while the particles are still uniformly distributed upon the outer surface of the bowling ball, is thus described herein as an adjunct to utilization of the above described invention. The realization and appreciation that particles could effectively be added to bowling balls to improve their performance was discovered and confirmed while experimenting with microscopic light-weight glass bubbles added to the ball in an attempt to produce a practical lightweight ball. The inventor is unaware of other bowling balls which utilize the disclosed methods to produce bowling balls comparable to the disclosed bowling balls.

DESCRIPTION OF THE PREFERRED EMBODIMENT

Known types of equipment are used in manufacturing a bowling ball according to the invention. As explained above, the manufacture of bowling balls containing an inner core and an outer shell is known in the art and such known manufacturing techniques are partially used in the present invention. It will be understood by those skilled in the art that a plurality of inner cores and outer shells of the same or varying compositions may be used and provided for in the manner shown below for a bowling ball having a single inner core and a single outer shell. It will additionally be understood that a single solid ball, comprised entirely of the described admixture or comprised of some other admixture containing the described types of particles may be used. Outer layer as used herein refers to the portion of the ball at and near the balls outer surface.

While different thermosetting resins may be used to form the outer shell, it is preferred, and best results are obtained, when a polyester resin is used. For the purposes of description only, the invention will therefore be described in connection with a thermosetting polyester resin outer shell about an inner core.

For definitional purposes, the term "admixture" will be used to describe the totality of the mixed components of a shell located about a core, the components being the substrate and high performance particles; the particles being of which ever type the contex refers to. The term "substrate" will be used to describe the composite of all components of the outer shell other than the particles which are added for their high performance characteristics.

Figure 1:
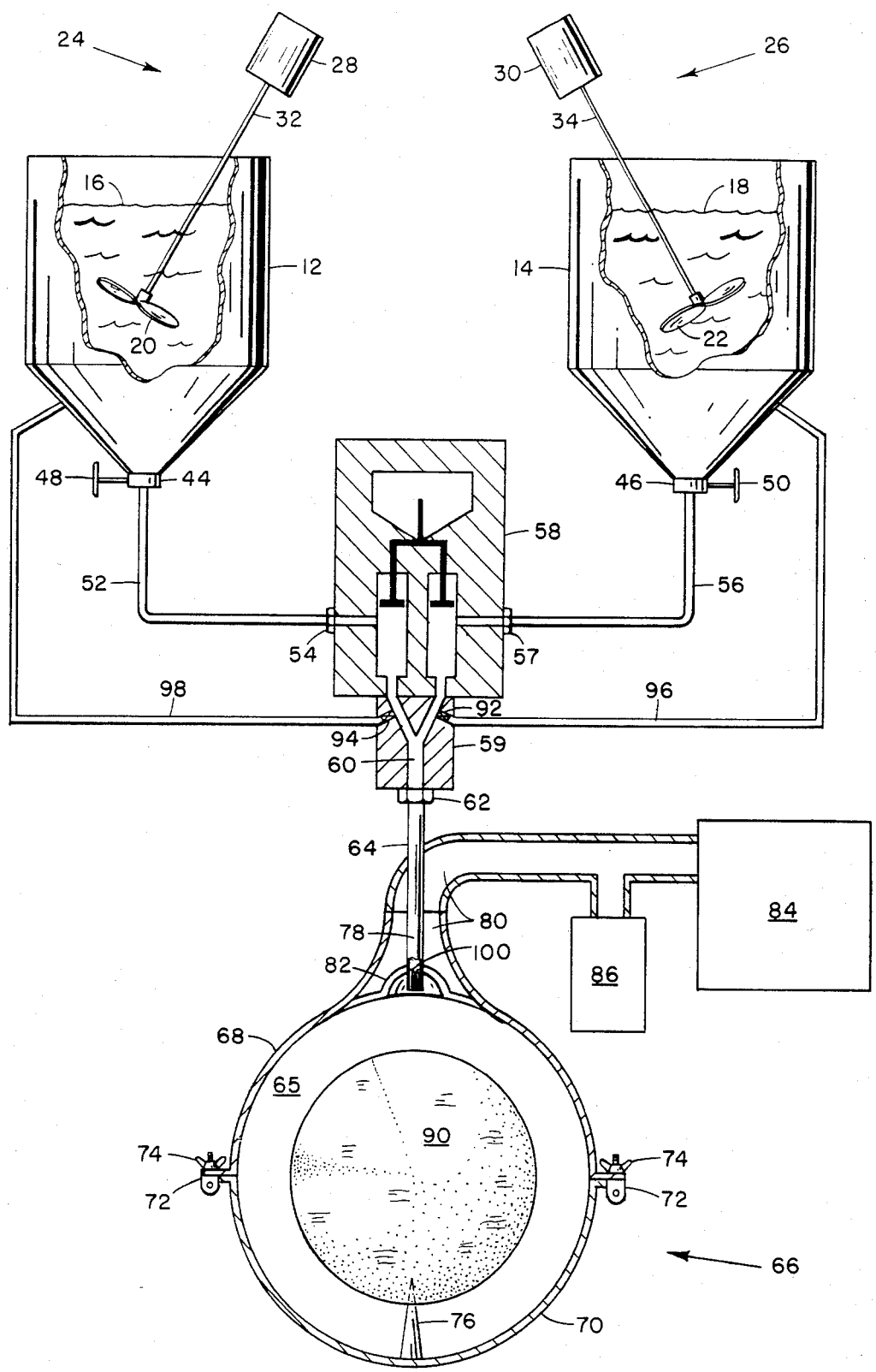
FIG. 1 is a view of the apparatus necessary to implement the described method of manufacture.

Referring to FIG. 1 of the drawings, there is shown an apparatus 8 for manufacturing the invented high performance bowling ball having a heterogeneous outer shell 10.

Vat 12 and vat 14 contain polyester resin type premixtures, 16 and 18 respectively as shown. Polyester resin premixtures 16 and 18 are agitated and mixed by propellers 20 and 22 of mixers 24 and 26. Mixer motors 28 and 30 rotate mixer shafts 32 and 34 to which propellers 20 and 22 are attached respectively.

Vat 12 and vat 14 have sloping bases 36 and 38 which terminate at outlet openings 40 and 42. Outlet valves 44 and 46 are attached to outlet openings 40 and 42 and together with outlet valve handles 48 and 50 control any flow through the outlet openings 40 and 42. Pipe 52 connects vat 12 and valve 44 to inlet 54. Pipe 56 connects vat 14 and valve 46 to inlet 57. A two-piston proportioning pump 58 expels predetermined quantities of premixture 16 and of premixture 18, and mixer 59 combines premixture 16 and premixture 18. Portions of the premixtures 16 and 18 not used in any given stroke of pump 58 are exhausted through mechanically operated valves 92 and 94, pipes 96 and 98, and back to their respective vats 12 and 14. Either static or motorized mixers 59 may also be used as is discussed below to combine premixtures 16 and 18 in the proportions desired to produce final mixture 60. Final mixture 60 is expelled through mixer outlet 62 and into a heated (steam jacket) conduit 64 which leads to mold space 65 located about bowling ball inner core 90 and within mold 66.

Mold 66 is composed of top mold half 68 and bottom mold half 70 which are fitted and clamped together by fittings 72 and clamps 74. Bottom mold half 70 contains pin 76. An inlet tube 78 and circumferential outlet tube 80 are connected to mold portal 82 as shown. A pressure sensitive poppet valve 100 prevents final mixture 60 from flowing through inlet tube 78 except when desired. The outlet tube 80 is connected to vacuum pump 84 and trap 86.

Although a polyester resin is preferred, most materials suitable for making bowling balls, such as polyurethane, vinyl esters, epoxies or any thermoset material, may be used. "Resin" is used in the generic sense and is defined as a thermosetting synthetic organic product with a high molecular weight and having high strength and moisture resistance characteristics when cured. Use of the term "resin" is further limited to such products as may usefully comprise a bowling ball or a bowling ball shell. While practically any resin having the desired characteristics may be used, polyester resin compounds of the type identified in the referenced patents or known in the art are typically used and are prepared by combining premixtures 16 and 18 within mixer 58.

A selected polyester resin utilized in the practice of the invention comprises the reaction product of at least one glycol selected from butylene glycol, diethylene glycol, dipropylene glycol, ethylene glycol, neopental glycol and propylene glycol with one or more acids or acid anhydrides selected from adipic acid, azelaic acid, fumaric acid, isophthalic acid, terephthalic acid, maleic anhydride and phthalic anhydride, wherein at least fumaric acid or maleic anhydride is used. Suitable monomers include one or more selected from alphamethyl styrene, chlorostyrene, methyl methacrylate, styrene and vinyl toluene. It is understood that each such polyester resin may be cured at room temperature or at elevated temperatures with suitable catalysts.

Any polyester resin conventionally used or suitable for manufacturing outer shells for bowling balls may be used if it can be modified as discussed below to tolerate the addition of the described particles. A preferable combination when a soft particle such as ground rubber is employed which may be used is comprised of approximately 42% by weight of a rigid orthophthalic type polyester resin combined with approximately 52% flexible isophthalic type polyester resin. The ratio of rigid resin to flexible resin is directly dependent upon the type particles used, however. A hard particle, such as hollow fly ash spheres, or a fibrous or flaked particle, may require a softer resin blend, such as 22% by weight rigid orthophalic type polyester resin and 78% by weight flexible isophthalic type polyester resin. The varying percentages of rigid to flexible resin are useful in maintaining a composition which is most beneficial in use and yet also passes the American Bowling Congress specifications, in particular, registering a 72 durometer D.

A satisfactory rigid polyester resin is sold under the trademark "Reichhold 32-113" and a satisfactory flexible polyester resin under the trademark "Reichhold 31-832", and both may be purchased from Reichhold Chemicals Incorporated, a well-known polyester resin supplier. The exact composition of these polyester resins is old in the art and no claim of novelty is made thereto. To make a typical "batch" for making a number of bowling balls, approximately 600 pounds of this polyester resin mix and 140 pounds of 0.7 g/ml fly ash particles is distributed approximately equally between vat 12 and vat 14. This is normally sufficient for manufacturing approximately 100 bowling balls, although the exact number will vary.

Any catalyst and promoter combination suitable for curing the polyester resins may be used, however, it is preferred to use a catalyst mixture containing approximately 1.7 pounds methyl ethyl ketone peroxide, 0.6 pounds tertiary butyl perbenzoate, and 0.6 pounds di-tertiary butyl peroxide added to and mixed within the polyester resin mix of vat 12 and a promoter mixture of 0.2 pound of 2,4-pentanedione together with 0.4 pounds of 12% cobalt octoate added to and mixed within the polyester resin mix of vat 14. Other common catalysts may also be used, including without limitations benzoyl peroxide, lauryl peroxide, 2,4-pentanedione peroxide, and many others. Other common promoters may also be used, including without limitation cobalt naphthenate, copper napthenate, dimethyl aniline, diethyl aniline, various quaternary ammonium salts, and many other amines. The two vat system of preparing the final mixture is necessary because the reactants cause an extremely rapid gel and cure when mixed.

Five separate types of particles may be used to obtain the desired high performance characteristics:

(a) Hard abrasive materials, such as hollow fly ash microspheres, barium sulfate, aluminum oxide, silicon carbide, sand and other crushed minerals and high density glass bubbles, which are uniformly distributed upon the surface of the ball and which dig into the surface of the bowling alley and give the bowling ball a microfine grained surface to prevent hydroplaning as occurs in conventional balls;

(b) Soft materials, such as talc or calcium carbonate, which are uniformly distributed upon the surface of the ball and which flake out of the resin matrix during the machining, grinding, and polishing phases of manufacture to produce a fine grained outer surface which prevents hydroplaning as occurs in conventional balls;

(c) Resilient materials, such as soft granulated rubber, which are uniformly distributed upon the surface of the ball and which protrude from the surface subsequent to grinding the ball (the grinding removing more of the inflexible resin matrix than of the granulized rubber due to the rubber partially defeating the grinding process by compressing) which produce a bowling ball with a high coefficient of friction and a fine grained outer surface to prevent hydroplaning as occurs in conventional balls;

(d) Low density bubbles which are uniformly distributed upon and close to the surface of the ball which bubbles collapse during the manufacture and use of the bowling ball to produce a fine grained outer surface to prevent hydroplaning as occurs in conventional balls; and (e) Flake and/or fiberous materials, such as micro flakes, flakes of slate, glass flakes, and milled glass fibers, which are uniformly distributed upon and close to the surface of the ball and which inhibit the penetration of sharp pointed objects, such as the harness tester indentor tip, into the ball. When grouped in a uniform and interlocking manner, the flakes and/or fiberous materials form an effectively continuous armored layer to prevent penetration of the ball.

These high performance particles are added to vats 12 and 14 in any manner as may be convenient and are mixed until a substantially equal distribution of particles within the resin particle admixture has been achieved.

One reason early attempts to use high performance particles in the outer shell failed was due to foaming and other air entrapment caused by addition of the particles. Only after addition of proper surfactants in amounts sufficient to control the problem of aeration was further experimentation concerning the manufacture able to continue. Surfactants and wetting agents, such as Dow-Corning Antifoam A, ICI Span 80, or Triton X100 in amounts of the final admixture ranging from 0.05% to 1.0% of the weight of the resin were found to be effective in this regard.

A preferable amount and type for the batch amounts used in the example would be approximately one pound of a silicone surfactant sold under the trademark of "Dow-Corning Antifoam A Compound" and which may be purchased from Dow-Corning Company, Inc. The surfactant is added in equal amounts to vat 12 and to vat 14.

A three vat system may also be used in which the resins, surfactants, coloring, and high performance particles are all mixed together within a premixer (not shown). The premixer comprises a vat with a horizontal shaft upon which are attached large notched blades whose length is perpendicular to the shaft and whose breadth is parallel to the shaft. This type of premixer has been found to more quickly mix and deaerate the particle/resin mixture with less damage to the particles themselves than other methods of mixing the particles into a liquid. If this three vat system is used, the mixed contents of the premixer are added in equal amounts to vat A containing reaction catalysts and vat B containing reaction promotors. The method of manufacture would then proceed in the same fashion as if vats 12 and 14 were fully mixed and ready to be used.

Additional means of degassing the premixtures 16 and 18 is to maintain the premixtures 16 and 18 in a comparatively low gas pressure environment before (about fifteen inches of mercury is preferred) and after addition of the high performance particles. This may easily be accomplished by sealing the vats and continually degassing them with a vacuum pump. The low gaseous pressure inhibits formation of additional gas pockets within the premixtures 16 and 18 and induces release of such gas pockets which are created. The premixtures must be mixed very slowly until the dry materials are wetted prior to application of the vacuum.

Concurrent with or after addition of the surfactant, sufficient quantities of the high performance particles are added to the batch mixture.

When the materials within vats 12 and 14 are thoroughly mixed, the outer valves 44 and 46 are opened by means of outlet valve handles 48 and 50. Premixtures 16 and 18 thus flow through outlet openings 40 and 42, pipes 52 and 56, and to proportioning pump 58 and mixer 59. Proportioning pump 58 and mixer 59 positively displace equal amounts of each premixture 16 and 18, thoroughly mix them, and quickly expel them into the mold 66 via heated conduit 64.

While other types of pumps and mixers may be used, a two-piston proportioning pump 58 provides the exact amounts needed to effectively combine promoters, catalysts, and resins, etc. Mixer 59 capable of mixing premixtures 16 and 18 without exposing either them or the final mixture 60 to air is used to reduce foaming and air entrapment.

In applying the resin/particle admixture outer shell 11 about the inner core 90, a particularly advantageous method is to situate the bowling ball inner core 90 within mold 66 and on top of pin 76 so that it is held equidistant from all sides of mold 65. Outlet tube 80 is connected to vacuum pump 84 and a vacuum maintained within the mold space 65 while the polyester resin particle compound enters mold 66 through inlet tube 78. In order to completely fill mold 66, some of the compound may be drawn into outlet tube 80 in which case it is caught by trap 86. Use of a mechanical vibrator will also help aid in releasing any remaining air bubbles.

The thickness of the polyester resin outer shell 11 created about inner core 90 may be of any desired thickness, although it typically varies from 0.25 inches to about 1.25 inches, and is preferably kept within a range of 0.33 inches to 0.75 inches. Final mixture 60 then cures within mold 66 and about the inner core at such temperatures as promotes rapid curing. Gelling within an oven at approximately 46° C. over a period of approximately 10 minutes has been found to be a preferable method for the example batch mixture. Cure takes 1-2 hours for complete hardness development.

An extremely rapid change of the resin in the outer shell from the liquid phase to the solid phase is necessary to prevent substantial particle flotation or settling. The change from the liquid phase to solid phase preferably occurs within less than 20 minutes to prevent such flotation and settling problems. Because such flotation and settling as does occur will primarily be of the larger particles, it is seen that it would quickly cause an uneven distribution of particles upon the outer surface of a kind which would affect the rolling characteristics of the ball. If rough and smooth spots were thus created upon the ball, its trajectory would be much less controllable than if the distribution were even throughout. The combination of polyester resins, catalysts, and promoters as described above, therefore, are selected partly for the rapid curing properties which the combination possesses. Other beneficial combinations include the benzoyl peroxide-dimethyl aniline system, t-butyl perbenzoate, etc.

An additional method of promoting a rapid cure is to affix a steam jacket (not shown) about conduit 64 and inlet tube 78. This additional heating of the resin mixture just as it is entering into mold 65 is effective to decrease the cure time even further as additional heat energy speeds the curing reaction.

Curing is the process of changing the properties of a resin or a resin mixture through chemical addition reactions. One of the differences between the present invention and the prior art is the present invention's emphasis upon the speed with which the initial phases of curing begin. A solid phase matrix or gel state sufficient to fix the high performance particles prior to significant movement of the particles must be speedily effected once the even distribution of the particles is no longer being maintained through the stirring of the mixture. A rapid "green cure" is, therefore, deliberately achieved. A green cure or gel state is a state of the resin mixture in which sufficient bonding between the resin chains has occurred to give the mixture as a whole certain solid phase characteristics although insufficient bonding between the chains has occurred to give that solid state matrix significant strength. Because of the selection of high performance particles within a density range precluding strong flotation or settling forces and because of the rapidly increasing viscosity within resin mixture, the first fragile solid phase matrix (gel point) is sufficient to fix the particles. As the curing progresses and the bonds between the resin chains become more numerous, the liquid phase is entirely eliminated and a solid phase of the resin mixture is produced having considerable strength.

A critical step concerns the use of adequate surfactants together with a vacuum type of degassing of the mixture as it fills the mold to prevent porosity development within the mixture.

Also critical is the rapid formation of the high liquid phase viscosity as soon as stirring of the mixture ends. This high liquid phase viscosity prevents significant high performance particle movement within the mixture pending complete fixation upon achievement of the green cure. After the green cure is achieved, the length of time necessary to achieve a full cure of the mixture is immaterial as concerns maintaining the particles in an even distribution throughout the outer shell of the bowling ball. Without the rapid onset of a high viscosity followed by a permanent fixing of the particles, the heavier particles would settle and the lighter particles would float, thus causing an uneven weight distribution within the completed outer shell of the bowling ball.

While the outer shell of the bowling ball is in a green state, it must be treated with great caution. Although the solid phase matrix is insufficiently strong to resist any impinging forces, deformations caused within it at this time may be retained as defects within the finished outer shell. These defects may either produce unsightly scars upon the surface or create possible fracture points within the outer shell, both of which would render the resulting bowling ball commercially unusable. The resin mixture must be maintained motionless, therefore, after the green cure is initiated and until a fuller cure develops.

After the outer shell has initially solidified sufficiently to maintain the high performance particles in place, curing may usefully occur at practically any temperature with the proper reactants, if the temperature is a controlled one. The reactants of the example are preferably cured at 46° C., but by varying the catalysts, promoters, and polyester resins, curing could be made to occur between 10° C. and 93° C. The period for curing may range between 25 minutes up to 24 hours.

Another major problem is that of attaining even particle distribution in outer shell 11 which is balanced by weight about the bowling ball center point. A preliminary problem is of proper initial distribution of the particles. The viscosity of the premixtures must be considered in determining the proper agitation parameters due to the adverse effect of greater viscosity upon rapid and even distribution. Certain types and grades of the particles will suffer greater destruction due to mechanical agitation than others as has been discussed above. After the particles have been evenly distributed, it is difficult to maintain such distribution due to the problems of particle flotation and settling at this point in the process. High viscosity, therefore, becomes an aid to maintaining the distribution as it slows down any particle movement due to flotation of settling. What is described in the example process, therefore, are premixtures 16 and 18 having low viscosities, which premixtures 16 and 18 upon combination into the final mixture 60 rapidly develop a higher viscosity or green cure. A complimentary technique is the addition of proper thixotropic agents, such as cabosil (fumed silica) or aerosil, to the premixtures 16 and 18 after the particles have already been evenly distributed and any entrapped air freed. Mica flakes, glass flakes, or other dispersible platelet materials may also be used to retard high performance particle movement. Also, small amounts of glycerine or other glycols may be useful.

If resins other than polyesters are used, their viscosity, gelling, and/or curing times must be regulated to substantially eliminate lightweight particle movement after the resins are placed in the mold.

Figure 2:
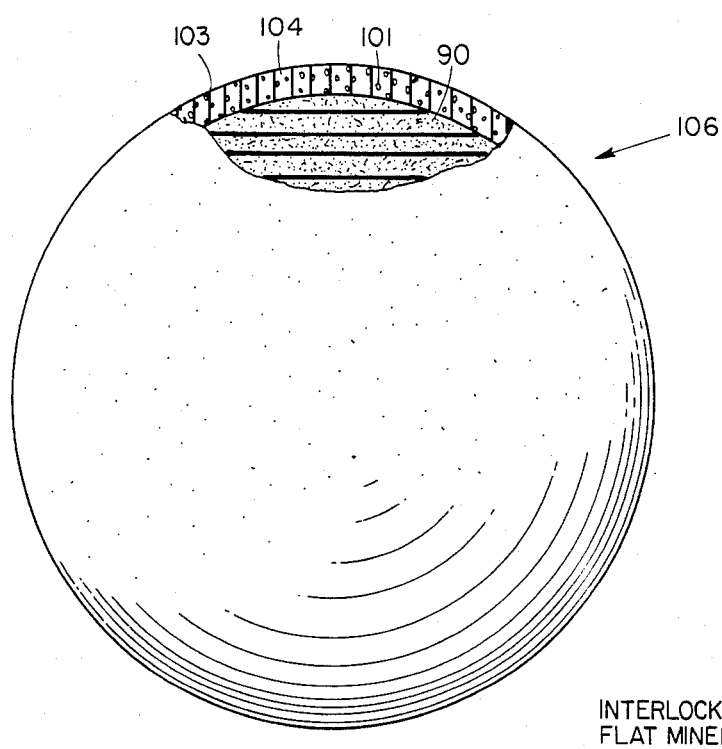
FIG. 2 is a view of a high performance 106 ball produced by the invented process having a small portion cutaway to provide a perspective view.

FIG. 2 shows a high performance ball 106 produced by the invented process having a small portion cutaway to show the inner core 90, the thermosetting resin substrate 104, uniformly distributed high performance particles 101, and surface breaking such particles 103.

Each of the high performance particles to be added to the admixture as described above are effective to produce a high performance ball by means of different methods. The types, uses and effects of these particles will be discussed individually below.

Figure 6:
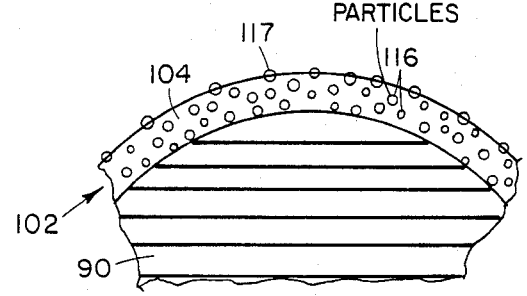
FIG. 6 is a view of a high performance ball having elastomeric or hard particles 116 uniformly distributed throughout the outer shell 102, some of them being located at the surface to be protruding particles.

FIG. 6 shows a greatly magnified view of a portion of a high performance ball having either hard abrasive or elastomeric particles uniformly distributed throughout the admixture 104 of the outer shell 102, some of the particles breaking the surface 117.

The hard abrasive high performance particles in part act as non-skid abrasives. When the ball is completed and ready for use, these particles project slightly from the outer surface of the bowling ball. The amount of projection is microscopic and often cannot be discerned by human touch but they are effective to protrude through the oil and grime buildups upon both the alley and the bowling ball itself to establish a firm frictionous contact with the alley. Because the substrate is more flexible than the particles, they tend to protrude more at the ball's area of contact with the lane than other areas of the ball. A microsopically discernable or barely discernable to the naked eye fine textured surface is therefore created upon the ball. This fine textured outer surface as compared to the conventional bowling balls acts to prevent hydroplaning of the bowling ball upon the oil and grime buildup on the lanes. The oil and grime buildup is channeled away from the protruding hard particles thus allowing them and the ball to remain in contact with the bowling alley. Further, the protruding hard particles additionally increase the traction between the ball and alley by digging into the alley. As a general rule, the larger the particles, the greater their effect will be in increasing the ball's coefficient of friction upon the alley. Upward limits upon particle size are aesthetic appearance, more rapid floating or sinking, damage to the alleys, uneven ball trajectory and A.B.C. Specifications requirements. Hard abrasive materials such as barium sulfate, aluminum oxide, finely ground sand, silicon carbide, hollow fly-ash microspheres or glass bubbles or any combination thereof are typically used as the hard particle of preference. These bubbles typically have thicker cell walls than those used within lightweight bowling balls and have densities in the range of 0.6 to 0.8.

It has been found that hard particles having an average diameter in the range from about 20 microns (micrometer) to about 300 microns may be effectively used. Use of such particles to create a high performance ball is considered to be effective if at least 1% more traction upon a typical bowling alley is achieved through addition of the particles than a similar bowling ball without such particles would have achieved without causing appreciable discontinuities in the ball's forward motion or damage to the lane. A typical amount of such particles within the admixture is between 6% and 38% of the volume of the total admixture. Regulating the volume of the particles used will vary the coefficient of friction of the ball produced. Amounts of particles higher than 38% by volume increase the ball's coefficient of friction beyond that desirable in that the ball created has a tendency to hook too early and to a greater degree than desired, making it difficult to hit the "pocket" being aimed at. Amounts of particles of less than 6% by volume cause insufficient improvement in performance to justify the expensive additional manufacturing steps involved.

Although fly ash, high density glass bubbles, or hard mineral particles are most conveniently used for this purpose, any particle having the above described desired characteristics may be used to produce such a high performance ball.

Figure 3:
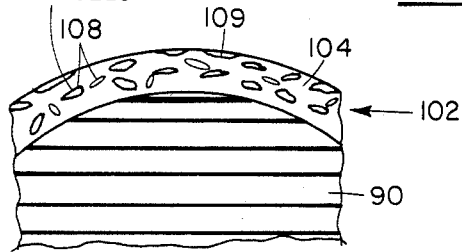
FIG. 3 is a greatly magnified view of a portion of a high performance ball having dissolvable particles 108 in the outer shell 104.

FIG. 3 shows a greatly magnified view of a portion of a high performance ball having dissolvable particles 108 uniformly distributed throughout the admixture 104 of the outer shell 102, some of the particles breaking the surface 109.

The use of soft inelastic materials to comprise the particles produces a high performance effect by the use of a different method. Soft particles, such as talc or calcium carbonate ($CaCO_3$), will flake or dissolve out of the resin matrix of the outer surface of the bowling ball during the machining and polishing operations or upon being washed with an appropriate solvent. Dissolving or flaking out of these soft particles will produce numerous small voids upon the outer surface of the ball. A microscopically discernable or barely discernable to the naked eye fine textured surface is, therefore, created upon the ball. It can be readily seen that the fine textured surface thus produced will also have a treadlike action upon the bowling alley. Both additional traction and prevention of hydroplaning upon oil and grime of the bowling alley are thus effected by using such soft particles.

Soft particles having an average diameter in the range from about 100 microns to about 300 microns may be used. An amount of soft particles sufficient to occupy from between 5 to 25% of the volume of the total admixture may be used, although 10% is preferable. If such a bowling ball improves the traction of the soft particle bowling ball by an amount of at least 1% above that of a similar bowling ball without said soft particles, and without causing appreciable discontinuties in the ball's forward motion or damage to the lane, inclusion of the soft particles for high performance characteristics is considered to be successful. Although talc and calcium carbonate are typically used as the soft particles, other soft materials having the above described characteristics may also be successfully used.

Resilient materials such as granulated soft rubber may be used. These soft particles protrude from the outer surface of the bowling ball. Because the soft rubber has a high coefficient of friction upon the bowling alley as compared to the resinous portion of the admixture, the granulated soft rubber will increase the traction of the bowling ball on the alley. In addition to the high coefficient of friction inherent in the soft rubber particle itself, such a heterogeneous admixture also produces the fine textured outer surface as described for the above hard particles and soft particles. The similar effects of point contact with the bowling alley and the prevention of hydroplaning are thus also present in the granulated soft rubber particle high performance ball.

Granulated rubber particles having an average diameter in the range from about 400 microns to about 650 microns are typically used. Such soft rubber particles typically occupy from 1 to 10% of the volume of the admixture. Use of such granulated soft rubber particles to produce a high performance ball is considered to be successful if the granulated soft particle bowling ball has at least 1% greater traction upon typical bowling alleys than similar bowling balls without such granulated soft rubber particles and without appreciable discontinuities in the ball's forward motion or damage to the lane. It is understood that other soft particles which have a high coefficient of friction upon bowling alleys, together with the other described characteristics, may be used in the place of or in addition to granulated soft rubber particles.

Figure 5:
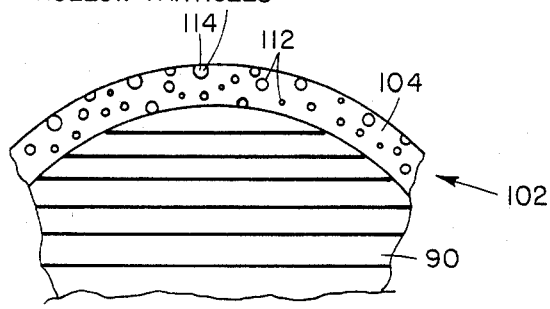
FIG. 5 is a greatly magnified view of a portion of a high performance ball having low density bubbles 112 uniformly distributed throughout the outer shell, 102 some of them being located at the surface to create pits 114.

FIG. 5 shows a greatly magnified view of a portion of a high performance ball having low density bubbles 112 uniformly distributed throughout the admixture 104 of the outer shell 102, some of the hollow particles having broken through at the surface to form cavities 114.

Low density bubbles, such as Q-CELL 200 grade or 3-m-C15-250, which collapse during manufacture and use of the ball to produce numerous small pits upon the outer surface of the ball, may also be used. The pits are either microscopically discernable or barely discernable to the naked eye as pits upon the surface. The uniformly distributed low density bubbles, when collapsed at or near the outer surface of the bowling ball, produce a fine grained surface upon the outer surface of the bowling ball. As discussed above, such a fine textured surface is effective both to increase traction upon a dry bowling alley and to prevent hydroplaning upon bowling alleys having a coating of oil and grime. The accumulated oil, wax and grime will be squeezed into the pits as the ball encounters it and thus the remaining surface of the ball will have a firmer contact with the alley. The fine pits increase friction by providing edges with which the otherwise slick ball may grab onto the alley. Additionally, when machining a ball containing glass bubbles, not only are pits formed, but microscopic sharp jagged edges of the broken bubbles protrude from the surface and dig into the alley.

The overall weight of the ball outer shell can be significantly decreased by the use of these or similar low density particles within the ball. Additionally, as is discussed further below, a ball which has a greater tendency to hook than conventional balls can be produced through the placement of such particles in the outer shell.

Low density bubbles having an average diameter in the range from about 20 microns to about 200 microns are typically used. An amount of such low density bubbles sufficient to occupy from 5% to 40% of the volume of the resin/low density bubble admixture may be used, although 36% is preferable. It is understood that any similarly sized particle which will collapse under pressure may be used in the stead of low density bubbles. Use of such collapsible materials to produce a high performance ball is considered to be successful if the collapsible material filled ball has at least 1% or greater traction upon typical bowling alleys than similar balls without such collapsible materials without appreciable discontinuities in the ball's forward motion or damage to the lane.

Flaked or fibrous materials may be used to reinforce a bowling ball outer shell and allow the use of softer resins at the outer surface of the bowling ball. The softer resin and hence softer outer surface of the ball increases the traction of the bowling ball upon the bowling alley both by causing the bowling ball to have a greater surface area upon the bowling alley and because the outer surface of such a soft resin ball has a higher coefficient of friction upon the bowling alley than conventional hard outer surface balls.

The difficulty with using soft resins or soft rubber upon the outer surface is that such bowling balls typically do not have a surface hardness of at least 72 durometer D as measured by a Shore D Hardness Tester. "Shore D Hardness Tester" is the trademark for a hardness testing device which is used to measure the hardness of bowling balls. The Shore D Hardness Tester is a well-known device in the bowling ball manufacturing industry. The 72 durometer D measurement is a measurement upon an arbitrary scale used by the American Bowling Congress as a reference and a cut-off point for acceptable bowling balls. Bowling balls which do not achieve a minimum 72 durometer reading upon a Shore D Hardness Tester cannot be used in American Bowling Congress tournaments and balls which do not achieve a 75 durometer reading cannot be used in Professional Bowlers Association (P.B.A.) tournaments. Because typical bowlers rely heavily upon the professional bowler's choice of bowling balls, it is very advantageous commercially for a ball to be approved by the A.B.C. or P.B.A. and thus be available for use in their professional tournaments.

Figure 4:
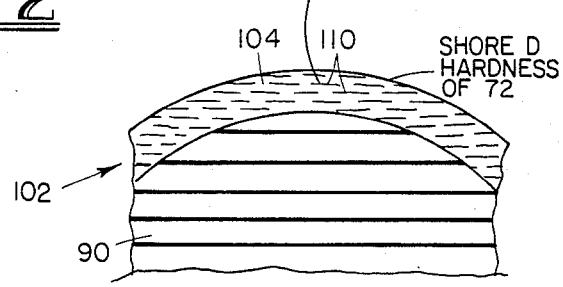
FIG. 4 is a greatly magnified view of a portion of a high performance ball having interlocking armored particles 110.

FIG. 4 shows a greatly magnified view of a portion of a high performance ball having armored materials 110 uniformly distributed throughout the admixture 104 of the outer shell 102.

The Shore D Hardness Tester tests hardness by applying a needle to a ball's surface and then, by using a precalculated scale, determining a durometer D measurement based upon the depth of needle penetration per unit of pressure applied by the needle to the ball. Use of appropriate flakes or fiberous materials which are properly uniformly dispersed near the surface of the ball can decrease the depth of the Shore D Hardness Tester needle per unit of pressure by forming flake or fiber barriers in front of the needle. When grouped in a uniform and interlocking fashion, the flakes and fibers form a continuous armored layer to prevent penetration by the test needle. Further, such interlocking creates a thicker and more impenetrable layer of such flakes and fibers to give an even higher durometer D test reading than would be caused by isolated such particles.

Use of such impenetrable interlocking flakes and fibers allows the use of softer resins upon the surface of the ball while still maintaining a sufficient durometer D hardness measurement to be a commercially practicable ball than could be used without the use of such flakes and fibers. The applicant is unaware of any bowling balls in the prior art which have successfully used reinforcing flakes and/or fibers in combination with resins which are sufficiently soft to increase the ball's traction upon the alley by at least 1% above conventional balls using typically used resins where both the soft resin ball and the conventional ball maintain a sufficient durometer D hardness to remain commercially practical.

The disclosed method of increasing the bowling ball's coefficient of friction with a softer resin while still satisfying the American Bowling Congress Rules is commercially very important. In selecting satisfactory flakes and fibers, attention must be paid not only to the hardness of the material but also to the material's ability to pack in interlocking layers close to the surface of the ball to prevent penetration by the Shore D Hardness Tester's needle. High aspect ratio mica flakes, flakes of slate, glass flakes, milled glass fibers, and other such hard and flat or hard and long fibrous materials may be beneficially used for this purpose. These flakes or fibers are not decorative in nature, and should not be confused with decorative mylar film or aluminum foil flakes cited in the prior art only as decorations, and which flakes do not provide the required additional surface friction necessary to produce a high performance ball. Such flakes or fiberous materials typically range from about −100 mesh to 40/100 mesh for flakes or up to 0.250 inches for milled fibers (0.125" typical) and typically have one spatial dimension which is at least a magnitude smaller than one other spatial dimension. They typically occupy from 1 to 10% of the volume of the outermost shell of such a flaked or fiberous particle bowling ball. It is understood that any flaked or fiberous material which is sufficient to meet the above described characteristics may be used. Selection of the resin will be determined by the success of the flakes and fibers in deflecting the Shore D Hardness Tester needle; the more effective the flakes and fibers, the softer the outer surface resin may be. Use of the aforementioned flakes or fibers also tends to give a textured appearance to the surface of such balls.

Use of the particles, flakes, or fibers as described above is considered to be successful if the high performance ball thereby created has at least 1% greater surface hardness than a similar bowling ball without said particles.

An additional advantage of using a resin/particle admixture within the outermost shell of a bowling ball is that the average density of the outermost shell can be controlled by the amounts and types of particles added thereto. Because of the law of conservation of angular momentum, a ball with a relatively light outermost shell and a relatively heavy inner core will have less angular momentum at a given rotational velocity than a ball of equal weight and which has equal density throughout. A benefit of using a solid ball with a greater inner density than outer density is that it can be caused to hook more easily upon bowling lanes than a ball of equal density throughout. In this way, the degree of trajectory control which a bowler may obtain the ball can be influenced by the chosen distribution of weight within the bowling ball. This has not practicably been previously done in a manner which would comply with the A.B.C. Specifications.

A ball containing lightweight particles is described in the inventors' prior filed application Ser. No. 106,749 of which this application is a continuation in part. Successful use of lightweight particles to appreciably increase the hooking action of a ball is accomplished by using the lightweight particles in combination with the other high performance particles described herein. The lightweight particles may have an average size in the range from 10 microns to 100 microns. A sufficient quantity of the lightweight particles is substantially uniformly distributed throughout the shell to reduce the weight by volume of the shell by at least five percent below the weight by volume of the shell substrate without the lightweight particles.

The combination of increasing the traction which a bowling ball has on the bowling lane and simultaneously increasing the degree of trajectory control due to manipulation of densities within the bowling ball by the means of a single adjustment to the bowling ball; i.e., the addition of carefully selected and distributed high or low density particles to the outer shell of the bowling ball, is thus both a novel and commercially usable invention. Combined control of both the bowling ball's traction upon bowling alleys and its density gradient by controlling a single vaiable has heretofore never been utilized.

Other variations can also be achieved by varying the density, size and amount of the particles together with placing them either at the core or at other positions within the ball to affect the ball's angular momentum. A ball with a lightweight core and a heavy shell, for example, would have a relatively large amount of angular momentum or rotational inertia and would be used by bowlers who desire their bowling balls to roll straight down the alley with a minimum of hooking. This type of ball would impart significantly more energy to the pins because it is less easily deflected by the pins and tends to blast through them because of its higher rotational inertia and corresponding angular momentum.

Additionally, a bowling ball of greater strength and longevity may be created by including either hard particles, flakes or fiberous materials within the outer shell. Addition of hard particles such as sand, ground mineral fillers, or high density borsilicate glass spheres which have a wide range of diameters interact to create a high packing fraction among the filler particles. This high packing fraction produced by the diverse diameters of the particles acts to distribute inertial shock from the point of impact throughout the bowling ball. Spreading of the impact reduces its deleterious effects upon the ball and increases the expected life of the ball.

A preferred embodiment is a ball having a core of less weight than is conventional but an outer shell of approximately 21% more mass than in a conventional ball. A typical conventional ball weighs about 16.00 pounds, 10.625 pounds of which is due to the core and 5.375 pounds of which is due to the outer shell. This weight distribution between the core and the shell is constant regardless of the overall weight of the ball for conventional balls. The preferred embodiment uses an approximate 9.50 pound core and an approximate 6.50 pound outer shell which is further enhanced with one of the friction causing particles described above. Balls of overall weights of 15 pounds, 14 pounds, etc. can be made with the same shell weight by reducing the core weight in increments.

The weight distribution between the shell and core of a conventional ball is thus approximately 1 to 2 while that of the preferred filled shell ball is approximately 1 to 1.5 or less although practicable beneficial results are obtainable from ratios of 1 to 1.8 and less. Because the radii of the core and shell are maintained as close to those of the conventional ball as possible the shift in weight distribution is accomplished by varying the densities of the core and the shell. To be practicable, the density of the added heavy particles must be at least 20 percent greater than the density of the shell's substrate.

Balls having increases in shell mass of up to 100% as compared to similar conventional balls of various overall weights have been made by the inventor and has been successfully used to increase ball performance. An example of such balls is one made by the inventors which has a core weighing approximately 4.75 pounds and a shell weighing approximately 11.25 pounds.

The total kinetic energy of the ball K at the moment of impact upon the pins is equal to the translational kinetic energy of the ball $K_T$ plus the rotational kinetic energy of the ball $K_R$.

$$K = K_T + K_R$$

The translational kinetic energies of balls having equal mass and speed are equal regardless of their weight distribution. The rotation kinetic energy of the ball, however, is dependent upon the distribution of the ball's mass and its angular speed $\omega$.

$$K_R = I\omega^2/2$$

I being the moment of inertia. It is seen, therefore, that increasing either I or $\omega$ or both will increase the amount of kinetic energy imparted by the ball to the pins.

n = The number of Radii in the ball n−1 = The number of concentric shells in the ball i = The number assigned to each of these n−1 concentric shells starting at the innermost shell and numbering consecutively to the outermost shell.

$$I = I_1 + I_2 + I_3 + \ldots + I_n$$

The Rotational Inertia of the core, or solid sphere is $I_1$ and the Rotational Inertia of the outermost concentric sphere is $I_n$. The individual terms of I are defined as follows: $I_1$ is the special case of a solid sphere and is given by:

$$I_1 = \frac{2M_1(R_1)^2}{5}$$

And the remaining terms are given by:

$$I_i = \frac{2M_i}{5} \frac{((R_i)^5 - (R_i - 1)^5)}{((R_i)^3 - (R_i - 1)^3)}$$

Therefore I may be given as:

$$I = \left(\frac{2M_1R_1^2}{5}\right) + \left(\frac{2M_2}{5}\right)\frac{(R_2^5 - R_1^5)}{(R_2^3 - R_1^3)} + \left(\frac{2M_3}{5}\right)\frac{(R_3^5 - R_2^5)}{(R_3^3 - R_2^3)} + \left(\frac{2M_{n+1}}{5}\right)\frac{(R_{n+1}^5 - R_n^5)}{(R_{n+1}^3 - R_n^3)}$$

It is thus easily seen that the I of a rolling ball having its mass concentrated in the outer shell will be greater than an equal mass ball having its mass concentrated near its center. The approximate 21% increase in the mass of the outer shell of the preferred embodiment thus gives a ball having an increased rotational inertia of approximately 5% which appears an optimum amount of increase. Balls of less than 16 pound stated weights may be made with all the advantages of the example ball by continuing to use the extra dense shell and lighting the core by appropriate amounts.

It should be emphasized that the desired effect is more effectively created by maintaining the shell at its conventional thickness and the core at its conventional radius and varing the densities of the core and outer shell. By maintaining the same outer shell thickness as in a conventional ball the new outer shell mass is added at the greatest possible radius thus maximizing the increase in rotational inertia and angular momentum as compared to a conventional ball.

The other controllable component of the above equation:

$$K_R = I\omega^2/2$$

is the angular speed $\omega$. The more frictionous outer surface created as described above causes the ball to begin a rolling contact with the alley as opposed to a sliding contact much earlier than conventional balls. Additionally, the quantity represented by the ratio of rolling motion over sliding motion increases much more rapidly when a frictionous outer surface is used. Both of these effects combine in causing the further effect of increasing the angular speed of the ball as compared to a conventional ball. As shown above, this synergistically acts to increase the ball's total kinetic energy upon impact on the pins, thus increasing the desired pin action.

A further advantage of increasing the rotational kinetic energy of the ball is that the force vector of this energy at the ball's point of impact upon the pins is in a downward direction. This is due to the tangential direction of the ball's angular momentum and the ball's equatorial point of impact. It is believed that this downward force vector combined with the linear force vector due to the translational motion of the ball produces a dominant force vector which slants forward and downward at the impact point. Thus a ball which is rolling rather than sliding will have a tendency to throw the pins down into the other pins rather than simply knocking the pins straight back or upward.

The invented combination of the described frictionous outer surfaces and a heavier than normal outer shell synergistically combine to produce a new and novel resultant ball which has improved properties over balls shown in the prior art.

An additional benefit thus derived from filling the outer shell with particles as is discussed above is that a stronger, longer lasting bowling ball can be made which has all of the additional advantages as discussed above.

It should be understood that each of the types of particles and methods described above may be used either singly or in combination with the other particles and methods to produce a practicable high performance bowling ball.

It is apparent from the above description that significant improvements in the art of high performance bowling balls are achieved by the instant invention.

While the invention has been described in connection with the preferred embodiment, it is not intended to limit the invention to the particular form set forth, but, on the contrary, it is intended to cover such alternatives, modifications, and equivalents as may be included within the spirit and scope of the invention as defined by the appended claims.

We claim:

1. A bowling ball having high performance particles substantially uniformly distributed throughout the outer layer and upon the surface of said ball:

said particles being armored particles and being hard and inflexible as compared to the substrate of said ball's outer layer, most of said armored particles being long and thin and having a long side at least ten times longer than said thin side is wide some of said armored particles being located at or just below said outer surface to form a substantially continuous armored layer about said ball causing said ball to have an appreciably greater resistance to penetration by a Shore D Hardness test needle than a bowling ball of identical composition to the claimed ball but without said armored layer, said armored particles being sufficiently small and of sufficient type to allow said ball to roll upon a bowling lane without appreciable discontinuities in forward motion and without appreciable damage to said bowling lane, said armored particles being sufficiently numerous and large to cause an increase in the surface hardness of said ball as measured by a Shore D Hardness Tester by at least one percent above the surface hardness of a bowling ball of identical composition to the claimed ball but without said armored particles.

2. The ball of claim 1 wherein some of said armored particles are arranged in a substantially interlocking relationship close to said surface of said ball, said ball having at least a 72 durometer D hardness and an outer layer substrate which is softer than the outer layer substrate of a similar ball without said armored particles having at least a 72 durometer D hardness and said ball with said armored particles having at least one percent greater fictional engagement with a bowling lane than said similar ball.

3. The ball of claim 2 wherein said armored particles comprise between 1 percent to 10 percent by volume of said ball's outer layer admixture and some of said armored particles comprise a flake type material having an average size from −100 mesh to 40/100 mesh.

4. The ball of claim 3 wherein at least some of said flake material comprise hard and flat mineral flakes.

5. The ball of claim 2 wherein said armored particles comprise between 1 percent to 10 percent by volume of said ball's outer layer admixture and some of said particles comprise a fiber type material having an average length of up to 0.25 inches.

6. The ball of claim 5 wherein at least some of said fibers comprise milled glass fibers.

7. A bowling ball having high performance particles substantially uniformly distributed throughout the outer layer and upon the surface of said ball:

said high performance particles being armored particles comprising between 1 percent to 10 percent by volume of said ball's outer shell admixture, some of said armored particles comprising a flake type material having an average size of from −100 mesh to 40/100 mesh and being hard and inflexible as compared to the substrate of said ball's outer shell, most of said armored particles being long and thin and having long sides at least 10 times longer than the thin sides are wide;

some of said armored particles are arranged in a substantially interlocking relationship and are located at or just below said outer surface to form a substantially continuous interlocking armored layer about said ball causing said ball to have an appreciably greater resistance to penetration by a Shore D Hardness test needle than a ball of identical composition to the claimed ball but without said armored layer;

said armored particles being sufficiently small and of sufficient type to allow said ball to roll upon a bowling lane without appreciable discontinuities in forward motion and without appreciable damage to said bowling lane;

said armored particles being sufficiently numerous and large to cause an increase in the surface hardness of said ball as measured by a Shore D Hardness Tester by at least one percent above the surface hardness of a ball of identical composition to the claimed ball but without said armored particles.

8. The bowling ball of claim 7 wherein said ball additionally is comprised of dissolvable high performance particles substantially uniformly distributed throughout the outer layer of said ball and high performance pits substantially uniformly distributed upon the outer surface of said ball;

said dissolvable particles being soluble in at least one solvent which the substrate of said outer layer is not significantly soluble in, said particles being of a type which dissolve during washing of said ball with a said solvent if located upon said ball's outer surface to create said pits upon said outer surface, said pits being sufficiently numerous and large to cause said bowling ball to have at least a one percent greater frictional engagment with a bowling lane than a similar ball without said pits;

said pits being sufficiently small and of sufficient type to allow said ball to roll upon said bowling lane without appreciable discontinuities in forward motion and without appreciable damage to said bowling lane.

9. The bowling ball of claim 7 wherein said ball is additionally comprised of hollow high performance particles substantially uniformly distributed throughout the outer layer of said ball and high performance pits substantially uniformly distributed upon the outer surface of said ball;

said hollow particles being of a type which collapse under pressure during manufacture of said ball if located adjacent to said ball's outer surface to create said pits upon said outer surface;

said pits being sufficiently numerous and large to cause said bowling ball to have at least a one percent greater frictional engagement with a bowling lane than a similar ball without said pits;

said pits being sufficiently small and of sufficient type to allow said ball to roll upon said bowling lane without appreciable discontinuities in forward motion and without appreciable damage to said bowling lane.

10. The bowling ball of claim 7 wherein said ball is additionally comprised to protruding high performance particles substantially uniformly distributed throughout the outer layer of said ball and upon the outer surface of said ball:

said particles being soft and resilient as compared to the substrate of said ball's outer layer and having a high coefficient of friction upon said bowling lane as compared to said substrate of said ball's outer layer;

said particles being protruding particles located to protrude from said ball's surface at said ball's area of contact with a bowling lane;

said protruding being sufficiently numerous and large to cause said ball to have at least a 1 percent greater frictional engagement with said bowling lane than a similar ball without said protruding particles, and said protruding particles being sufficiently small and of sufficient type to allow said ball to roll upon said bowling lane without appreciable discontinuities in forward motion without appreciable damage to said bowling lane.

11. The bowling ball of claim 7 wherein said ball is additionally comprised of protruding high performance particles substantially uniformly distributed throughout the outer layer of said ball and upon the surface of said ball:

said particles being hard and inflexible as compared to the substrate of said ball's outer layer, some of said particles being protruding from said surface at said ball's area of contact with a bowling lane, said protruding particles being sufficiently numerous and large to cause said ball to have at least a 1 percent greater frictional engagement with said bowling lane than a similar ball without said protruding particles, and said protruding particles being sufficiently small and of sufficient type to allow said ball to roll upon said bowling lane without appreciable discontinuities in forward motion and without appreciable damage to said bowling lane.

12. The bowling ball of claim 7 wherein said ball has a core and high density high performance particles substantially uniformly distributed through at least one shell located about said core:

said high density particles having average density at least 20% greater than the density of the substrate of said shell, said shell being a heavy shell, the density of said inner core being less than the density of the core of a conventional ball of equal outer ball radius and equal total ball weight, the density of said heavy shell being greater than the density of a similarly located shell of a conventional ball of equal outer ball radius and equal total ball weight, and the weight distribution ratio between the heavy shell and the core of said ball being 1 to 1.8 or less, the radius of said core being at least 3 inches, and the radius of said ball being no more than 4.3 inches, said ball being constructed to have at least 1 percent greater angular momentum at the end of a bowling lane after being bowled down said lane than a similar ball of equal radius and equal overall weight but having uniform density throughout.

13. The bowling ball of claim 7 wherein said ball is additionally comprised of lightweight particles substantially uniformly distributed throughout a shell located about said ball's core:

said particles being sufficient to reduce the weight by volume of said shell by at least five percent below that of the weight by volume of said shell with said lightweight particles, said lightweight particles having an average size in the range of from 10 microns to 100 microns, said combination of said lightweight particles and said high performance particles being effective to appreciably increase the hooking action of said ball.

* * * * *